United States Patent
Auerbach et al.

(10) Patent No.: US 7,587,388 B2
(45) Date of Patent: Sep. 8, 2009

(54) SEPARATING UPLOADS INTO AGGREGATE AND RAW DATA STORAGE

(75) Inventors: Alan B. Auerbach, Sammamish, WA (US); Shawn M. Murphy, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 335 days.

(21) Appl. No.: 11/191,322

(22) Filed: Jul. 28, 2005

(65) Prior Publication Data
US 2007/0027843 A1   Feb. 1, 2007

(51) Int. Cl.
*G06F 17/30* (2006.01)
(52) U.S. Cl. ............... 707/3; 707/1; 707/2; 707/200
(58) Field of Classification Search ............ 707/2, 707/3, 1, 200
See application file for complete search history.

(56) References Cited

U.S. PATENT DOCUMENTS

| | | | | |
|---|---|---|---|---|
| 5,428,357 A * | 6/1995 | Haab et al. | ............. | 341/155 |
| 5,526,362 A * | 6/1996 | Thompson et al. | ............. | 370/516 |
| 5,918,232 A * | 6/1999 | Pouschine et al. | ......... | 707/103 R |
| 6,185,736 B1 * | 2/2001 | Ueno | ............. | 725/95 |
| 6,611,839 B1 * | 8/2003 | Nwabueze | ............. | 707/101 |
| 6,643,635 B2 * | 11/2003 | Nwabueze | ............. | 707/2 |
| 6,877,006 B1 * | 4/2005 | Vasudevan | ............. | 707/10 |
| 6,901,536 B2 * | 5/2005 | Davenport | ............. | 714/39 |
| 6,959,306 B2 * | 10/2005 | Nwabueze | ............. | 707/104.1 |
| 7,117,215 B1 * | 10/2006 | Kanchwalla et al. | ............. | 707/100 |
| 7,133,865 B1 * | 11/2006 | Pedersen et al. | ............. | 707/3 |
| 7,167,864 B1 * | 1/2007 | Vasudevan | ............. | 707/10 |
| 7,231,403 B1 * | 6/2007 | Howitt et al. | ............. | 707/104.1 |
| 7,254,590 B2 * | 8/2007 | Mudunuri et al. | ............. | 707/200 |
| 2002/0124001 A1 * | 9/2002 | Chaudhuri et al. | ............. | 707/100 |
| 2002/0191559 A1 * | 12/2002 | Chen et al. | ............. | 370/329 |
| 2003/0088481 A1 * | 5/2003 | Elias | ............. | 705/26 |
| 2003/0172017 A1 * | 9/2003 | Feingold et al. | ............. | 705/35 |
| 2003/0229652 A1 * | 12/2003 | Bakalash et al. | ............. | 707/200 |
| 2004/0098663 A1 * | 5/2004 | Rey et al. | ............. | 715/500 |
| 2005/0076067 A1 * | 4/2005 | Bakalash et al. | ............. | 707/200 |
| 2005/0149491 A1 * | 7/2005 | Bakalash et al. | ............. | 707/2 |
| 2006/0209691 A1 * | 9/2006 | Boggs | ............. | 370/230 |

OTHER PUBLICATIONS

U.S. Appl. No. 11/084,621, Murphy et al.
U.S. Appl. No. 11/088,583, Murphy et al.

* cited by examiner

*Primary Examiner*—Don Wong
*Assistant Examiner*—Thanh-Ha Dang
(74) *Attorney, Agent, or Firm*—Marshall, Gerstein & Borun LLP

(57) ABSTRACT

A system for sampling raw data from a reporting application and segmenting portions of the sampled data into at least one of a set of raw data stores. The system enables ad hoc querying to be done against a data warehouse using the set of raw data stores and in conjunction with an aggregate store. A reporting aspect of the system is responsible for locating the appropriate store when responding to a query. The system also segments data based on anticipated usage of the raw data and appropriately places them into a raw data store having an access speed that corresponds to the anticipated usage level of the data.

12 Claims, 8 Drawing Sheets

SEPARATING UPLOADS INTO AGGREGATE AND RAW DATA STORAGE

BACKGROUND

Certain software products are able to monitor themselves during execution and produce data points relating to status condition, action, event and other parameters and characteristics of the product or its working environment. These data points may be collected in a data warehouse. A software manufacturer may then query the data warehouse to obtain various metrics regarding its product.

The general process of data warehousing may include accepting raw data points, e.g., the unprocessed data sent from a software application, and performing some organization of the data points in order to store them in a structured manner within a database so that queries may be efficiently run on the database. However, setting up a data warehouse to accept incoming data points requires a prediction of the types of information that will be requested from the data warehouse.

Defining data structure prior to querying may result in queries being limited to a range of data and/or having a constrained view of the data, thereby inhibiting ad hoc querying. Moreover, while storing unstructured raw data may provide information to satisfy an ad hoc query, storing unstructured raw day may be prohibitively expensive as reporting applications tend to produce inordinate amounts of data. Also, querying unstructured data is cumbersome and inefficient.

SUMMARY OF THE INVENTION

The present invention enables ad hoc querying of a data warehouse by dividing received application data into an aggregate data store and one or more raw data stores. A modification of the invention involves a reporting tool that is able to locate the correct data store to respond to queries, extract the data, and generate a report.

DRAWINGS

DETAILED DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Figure 1:
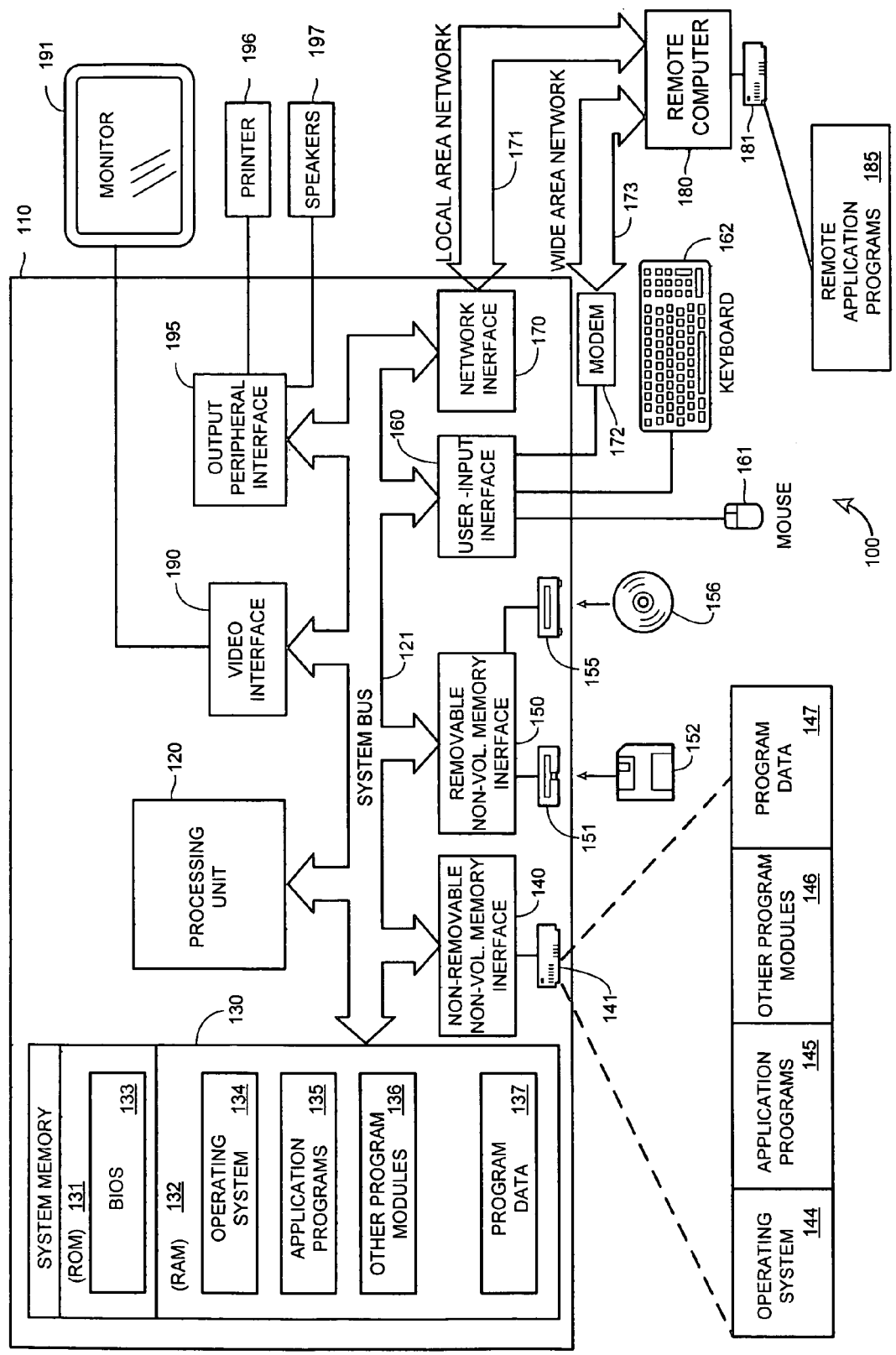
FIG. 1 illustrates a block diagram of a computing system that may operate in accordance with the claims.

FIG. 1 illustrates an example of a suitable computing system environment 100 on which a system for the blocks of the claimed method and apparatus may be implemented. The computing system environment 100 is only one example of a suitable computing environment and is not intended to suggest any limitation as to the scope of use or functionality of the method and apparatus of the claims. Neither should the computing environment 100 be interpreted as having any dependency or requirement relating to any one component or combination of components illustrated in the exemplary operating environment 100.

The blocks of the claimed method and apparatus are operational with numerous other general purpose or special purpose computing system environments or configurations. Examples of well known computing systems, environments, and/or configurations that may be suitable for use with the methods or apparatus of the claims include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The blocks of the claimed method and apparatus may be described in the general context of computer-executable instructions, such as program modules, being executed by a computer. Generally, program modules include routines, programs, objects, components, data structures, etc. that perform particular tasks or implement particular abstract data types. The methods and apparatus may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the blocks of the claimed method and apparatus includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network-connections shown are exemplary and other means of establishing a communications link between the computers may be used.

Figure 2:
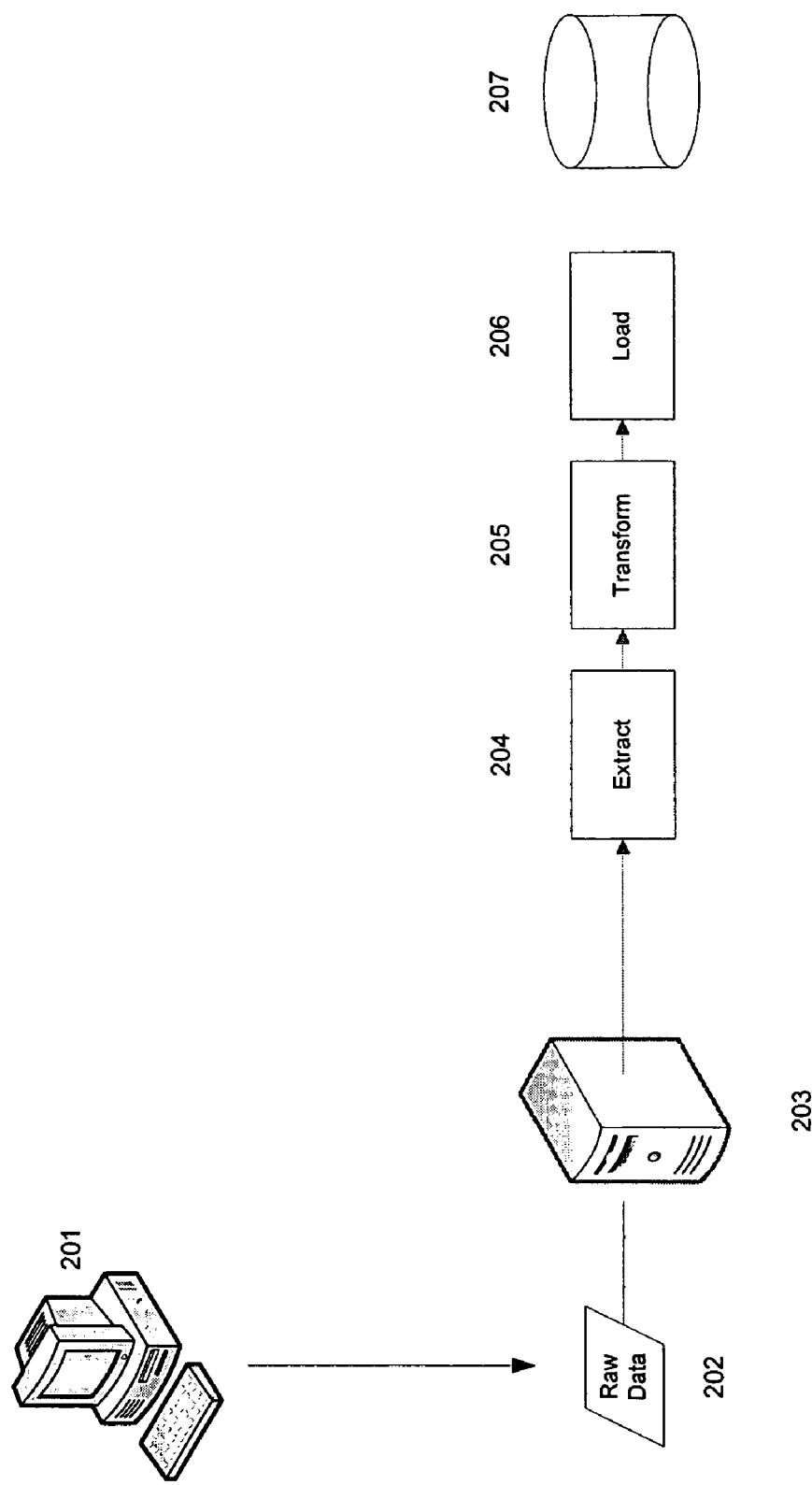
FIG. 2 illustrates a general data warehouse process.

FIG. 2 illustrates the general process of data warehousing. Generally, a reporting application 201 will communicate raw data 202 to a data warehouse processing server 203 where the data warehouse processing server 203 may perform some functions on the data 204-206, and load the manipulated data into a structured database 207. The process of manipulating raw data into aggregated, or structured, data for storage into a database is called extract 204, transform 205, and load 206 (ETL). The data warehouse stores aggregated data after the processing server has completed manipulating, or transforming the data. The raw data file may contain a set of data points. A data point is a basic measurement unit that holds information representing a quantity or measure of a reporting application. Examples of data points include a number of favorites, a length of time that a user keeps the dial-up properties window open, and a screen resolution of a user monitor.

The data warehouse may comprise more than one storage device. For example, a data warehouse may comprise a storage area network (SAN). The SAN may comprise a set of databases connected by a network. In a SAN, data may be geographically stored in different databases, however, information requests are processed by the SAN without the need for a requestor to be aware of the actual location of the data.

Creating a data warehouse system generally involves defining a set of cubes. A cube is a specialized type of database that optimizes the manipulation and storage of data. A dimension of a cube is a descriptive or analytical view of numeric data in a cube. For example, when a report is created from a data cube, the data are grouped by dimension. A dimension may also be considered a data label, where the label describes a characteristic of the data.

The process for creating a data warehouse generally begins by defining a set of dimensions for a set of cubes. In determining the dimensions or parameters of a cube, data warehouse designers typically anticipate the types of information requests that will be demanded of the data warehouse. For example, a designer may anticipate the types of questions or reports a typical business executive may ask of the reporting data for a company's software application. A set of cubes can then be designed in order to facilitate the efficient organization of data. Once the cubes are designed and a database is configured to correspond to the cubes, a data warehouse processing server may configure an ETL process to accept application data and load the transformed data into the cubes. In some existing systems, the ETL is custom code created by a data warehouse designer. After the data is manipulated and loaded into cubes, the data may be called aggregate data. In response to a query, the aggregate data stored in the cubes may be provided in an efficient and structured manner. Aggregated data may represent compilations of raw data into statistically significant sets.

There may be times when a query is received that cannot be answered by any existing structured data, or cube. For example, a query corresponding to an executive's query regarding two dimensions or variables that have not been predefined by an existing cube would not be able to be answered readily. While a workaround solution may exist to extract the data from existing cubes, this solution may be suboptimal because it requires an inefficient extraction process and may require additional database and/or data warehouse expertise. The workaround solution may also be suboptimal because the solution requires guesswork on the correlateability of dimensions. Furthermore, aggregated data may not contain the necessary data points required to answer a non-defined query. For example, a workaround solution may require creating a new cube and waiting a duration of time for the cube to be populated with new data, and thus, a query cannot be answered for a prior time period. Therefore, additional raw data not captured in an aggregate store may need to be accessed occasionally, in an efficient manner, to answer non-defined, ad hoc queries.

Figure 3:
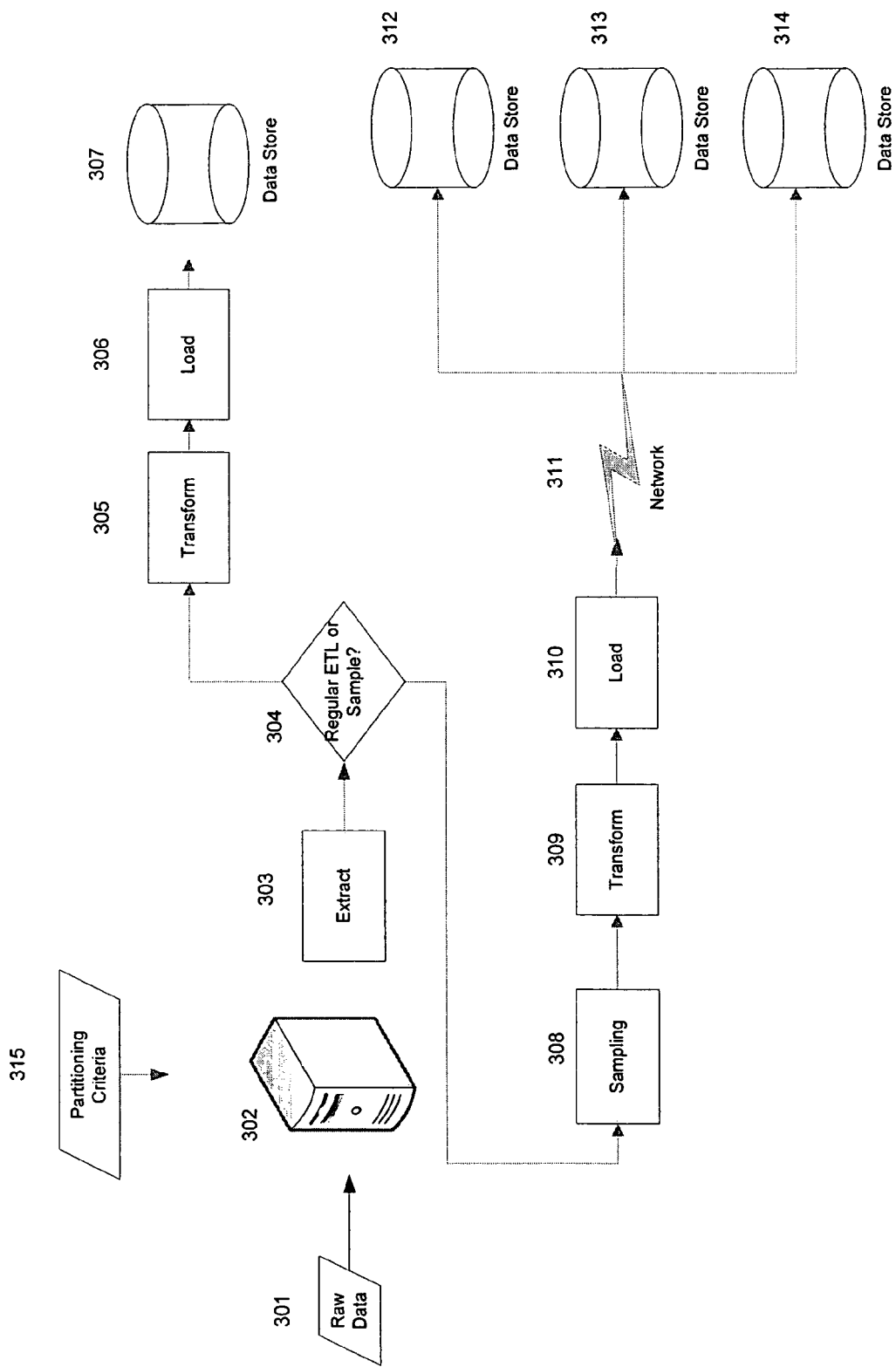
FIG. 3 illustrates a process embodiment of the claims.

FIG. 3 illustrates a process embodiment of the claims. A data warehouse processing server receives raw data 301. Based on a set of criteria 315, the processing server may decide to perform 304 a regular ETL process 303, 305, 306 on the received data and store the processed, or aggregated, data into an aggregate data store 307. The processing server 302 may also decide 304 to sample 308 the received data 301 and store the sample portions of the received data in a raw data store 312-314. The sample portions may also be divided based on a set of criteria where certain portions are stored in different raw data stores 312-314.

As illustrated in FIG. 3, the raw data store may comprise a set of databases 312-314 connected by a network 311, thereby forming a storage area network. The raw data stores may comprise different types of storage medium. The types of storage medium may be characterized by speed of data access. In an embodiment of the claims, the processing server determines which raw data store to store the information based on certain characteristics of the data. For example, data that is frequently accessed may be stored in a raw data store which has high speed access. Data that is more infrequently accessed may be stored on slower media. Slower media may include devices with slower operation times. Slower media may also include offline media such as computer tapes which must first be loaded (either by machine or manually) in order to access relevant data.

In an embodiment of the claims, the data warehouse process server may sample received data based on a set of time markers. These markers may coincide with milestone events within a business product cycle, such as a product update. In one embodiment, the received data may be sampled at a greater rate when the data received is closer to a milestone and sampled at a lesser rate when the data received is farther from a milestone. Alternatively, the received data may be sampled at one frequency and the sampled data may be partitioned into data closer to the milestones and farther from the milestones. The data points closer to a milestone may be stored in a high speed access raw data store, while the data points farther from a milestone may be stored in a low speed access raw data store.

Figure 5:
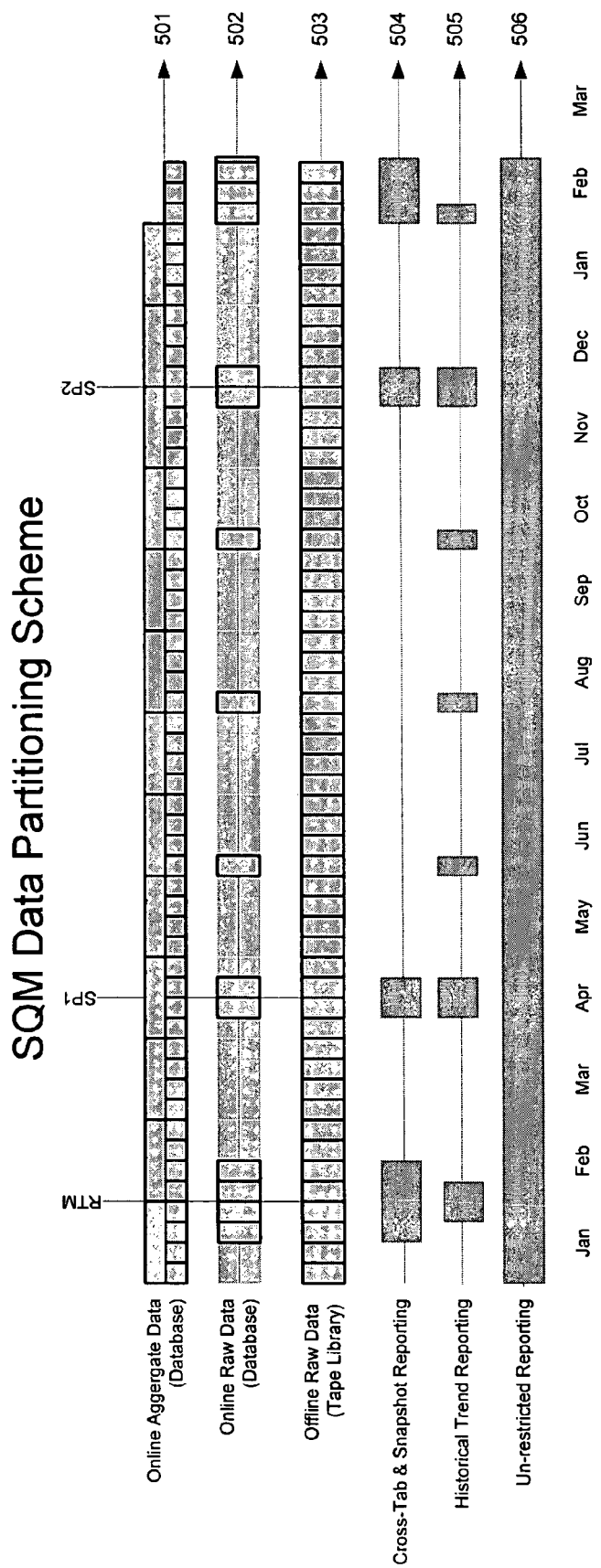
FIG. 5 illustrates data sample clusters over a time horizon.

The designation of milestones may be made manually and set by a human operator. Alternatively, the milestones may be calculated automatically by a computer. This calculation may be performed by the data warehouse processing server or by a separate server. In any case, the calculation may monitor changes in metric statistics and designate a milestone based on threshold parameters. For example, as illustrated in FIG. 5, a common milestone may be a release to manufacture (RTM) date, in which the traffic for a reporting application may dramatically increase (for example, from zero). The calculating function or device may monitor the rate of data received by the process server and trigger the creation of a milestone marker when the amount of traffic increases past a threshold. The milestone may also be manually created based on known product events.

Sampling based on milestones may be used to partition data into useful versus less useful data, and/or into statistically significant versus insignificant data. In a further embodiment, sampling may involve dividing the received data by dimension and maintaining a constant, or control, set of data points and a variable set of data points, where the variable set is randomly taken while the constant set uses fixed characteristic data points. Sampling the data in this manner may enable the processing server to detect when large, statistically significant deviations or differences occur between the control set and variable set. The processing server may then designate a milestone based on the detection of these deviations.

Sampling and partitioning of raw data may also be based on the usage patterns of the product, for example the amount of data traffic received. High usage pattern events may also create a time marker, or milestone marker. The usage patterns may also be based on data point dimensions. For example, the sampling may be influenced by the type of data being received by the process server. For example, a peak in data having a dimension indicating a statistically significant metric may trigger higher sampling and storage into a high priority media.

Figure 4:
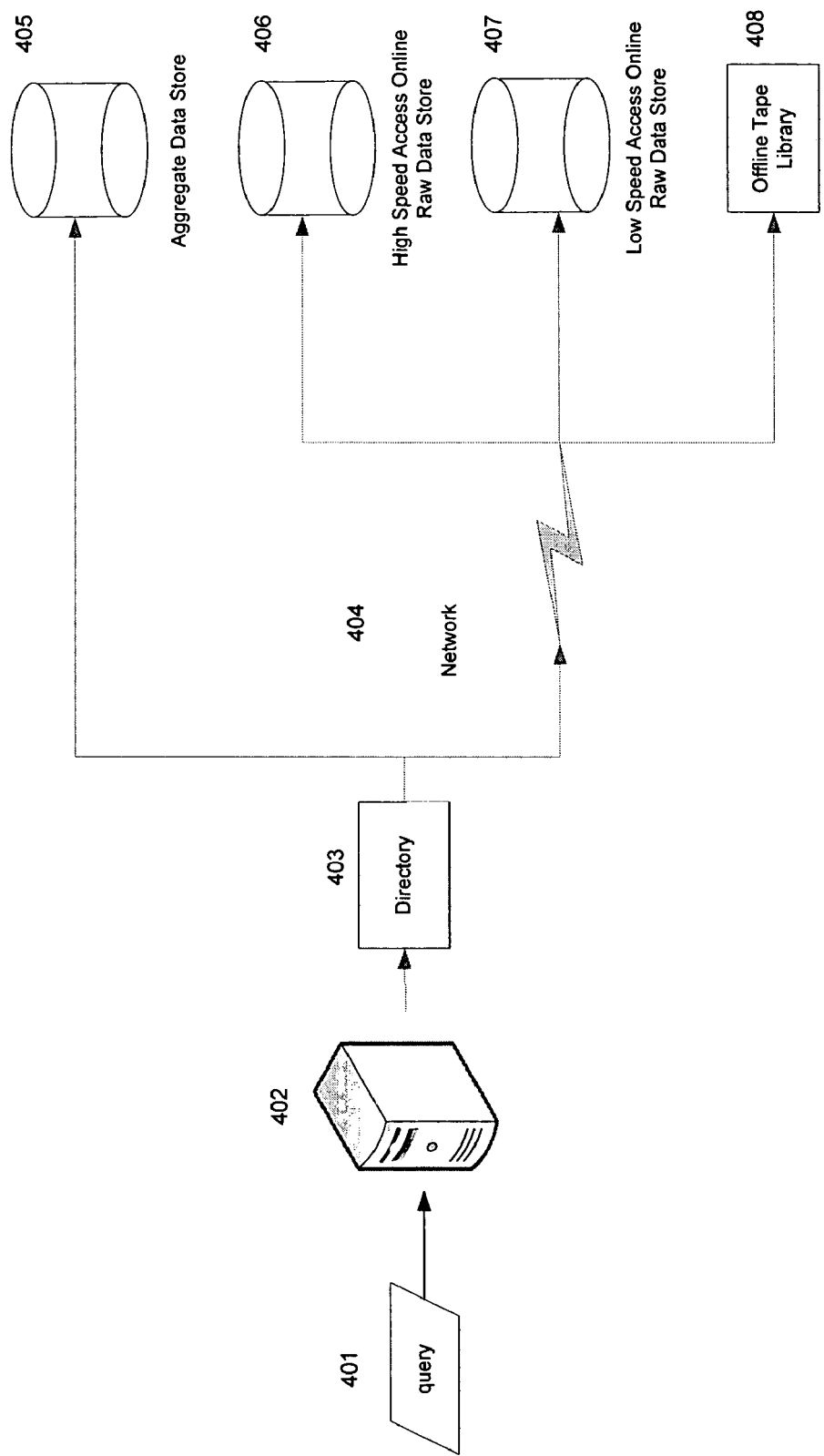
FIG. 4 illustrates a reporting process embodiment of the claims.

FIG. 4 illustrates a reporting process embodiment of the claims. A reporting server 402 may accept a user query 401 for a report and determine the type of data needed to fill the request. The reporting server may then access a table or directory 403 to determine whether the information is stored in an aggregate store 405 or one of a set of raw data stores 406-408. If the information can be obtained solely from the aggregate store 405, then the reporting server may simply query a data processing server for the required information to create the report. If the information is stored in a raw data store 406-408, the server will calculate and/or estimate the amount of time required to access and collect the required data from the raw data stores and return the estimate to the user or user application before executing the process for collecting the information. The reporting server may then extract the data from the raw store directly. Alternatively, the reporting server may initiate the creation of a data warehouse cube that is configured to answer the query and/or the reporting server may create a database table structured to answer the query. The cube or table may then be loaded with information from the set of raw data stores. The query can then be answered using the processing server.

Figure 6A:
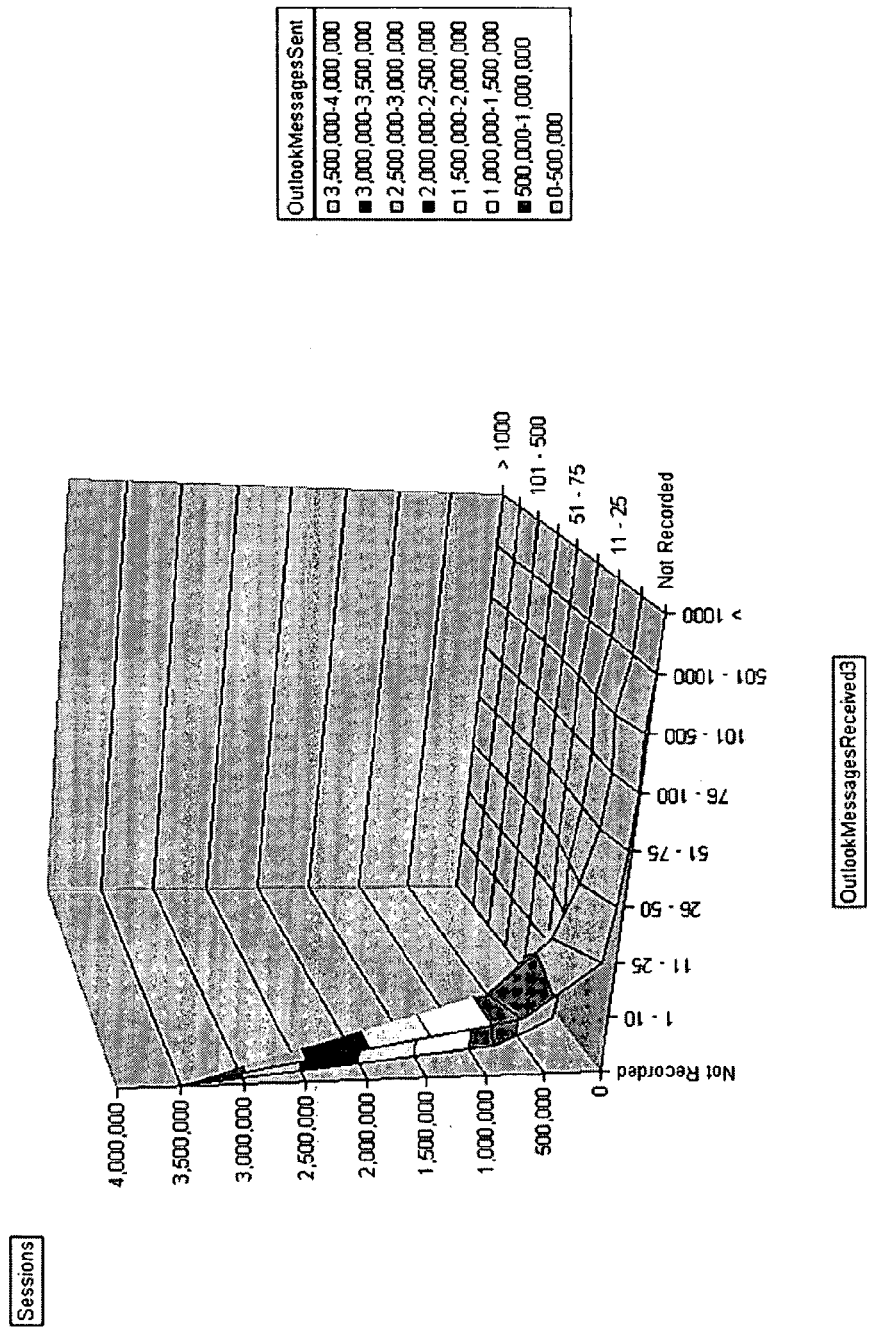
FIG. 6a-6c illustrate graphical reporting examples using the data clusters of FIG. 5.
Figure 6B:
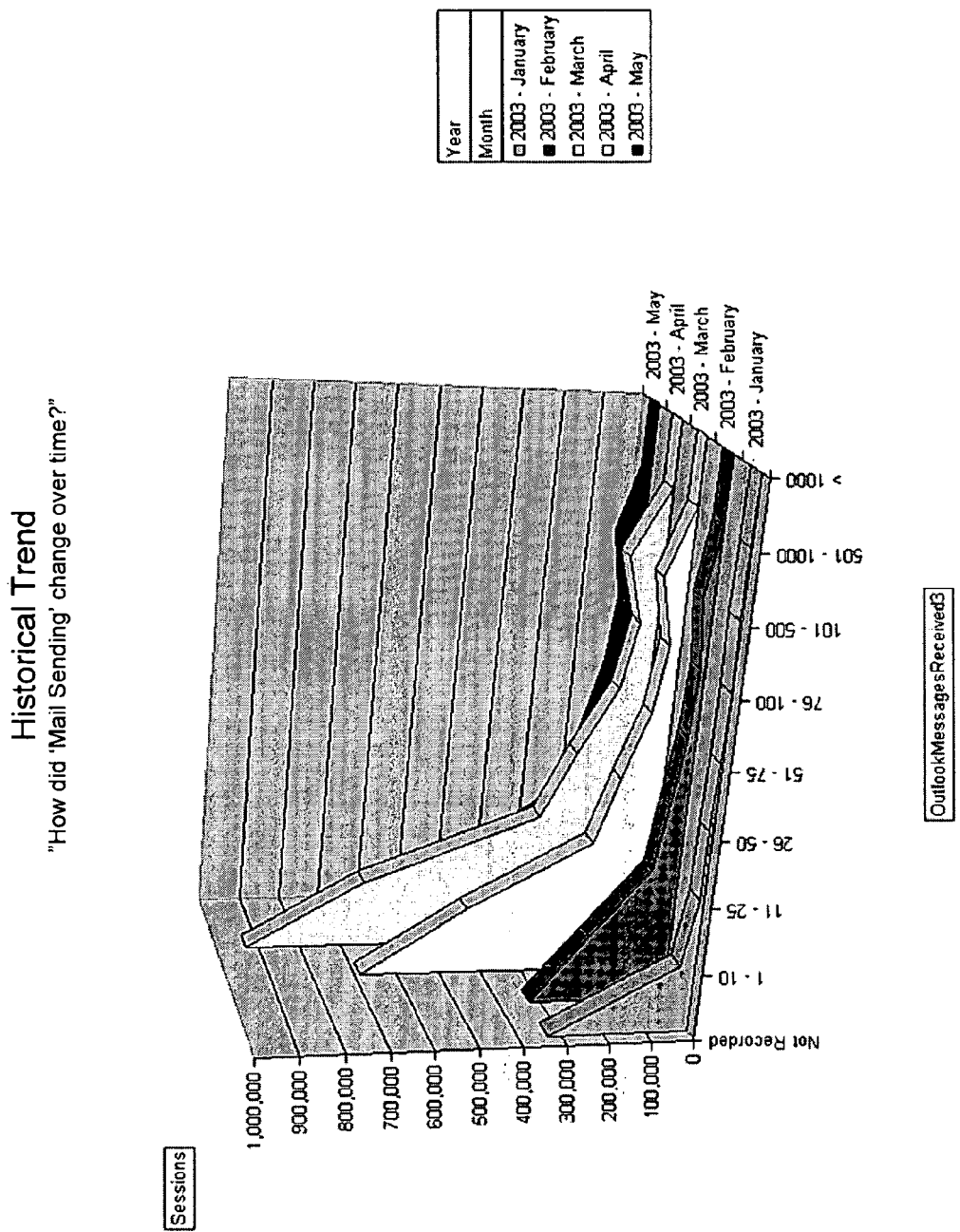
Figure 6C:
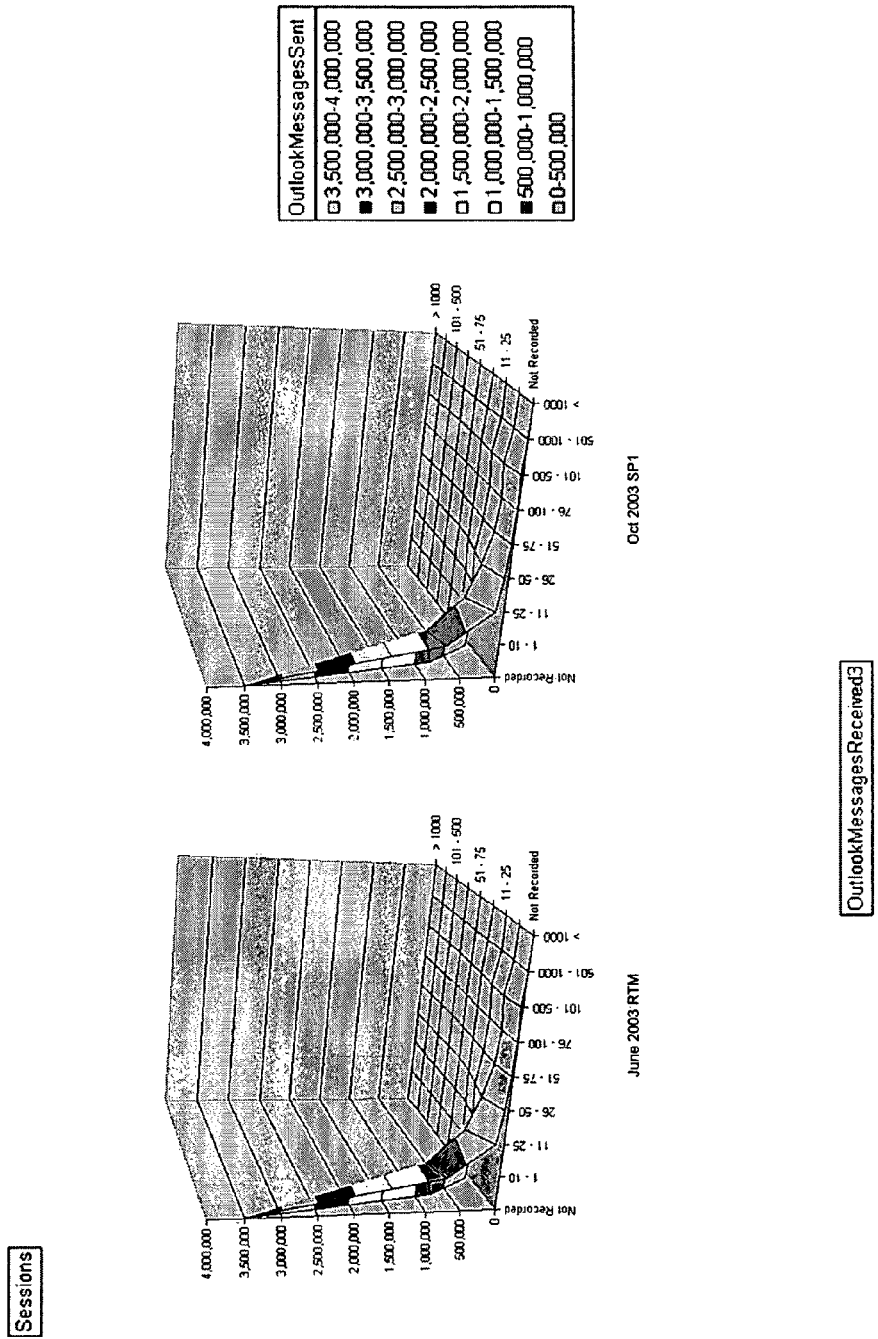

FIGS. 5 and 6a-6c, illustrate the additional reporting functionality possible from the claimed system and method. FIG. 5 illustrates data clusters received and stored in various medium over a time horizon. The online aggregate data line 501 provides most of the necessary information to accommodate average day to day queries for which the data warehouse was designed, e.g., using cubes. The online raw data 502 may contain a cluster of data points around significant product milestones, such as an RTM or a service pack (SP) release date. The online raw data is stored in a relatively high access medium. Higher sample rate raw data segments 503 may be stored in an offline data store having low speed access. Because dimensions are no longer inhibited and are alterable using the claimed system and method, various reports such as the ones listed below may be generated, such as cross-tab and snap-shot reporting 504, historical trend reporting 505, and unrestricted reporting 506. Examples of these reports are graphically illustrated in FIGS. 6a-6c. FIG. 6a illustrates a multi-dimensional cross tab report which provides N-dimensional reporting (e.g., allows a user to combine datapoints as dimension or measure) and ad-hoc, multi-variant reporting. This report requires raw data windows or samples. FIG. 6b illustrates a historical trend report which can be used to perform a trend analysis for a distribution of a few datapoint values. This report provides high performance, but is limited to a few dimensions. Aggregations & aggregation grain must be pre-defined for this report, meaning that more dimensions in aggregation dramatically increases disk usage. FIG. 6c illustrates a snapshot comparison report. This report provides the capabilities of N-dimensional cross-tab comparisons and ad-hoc analysis between points in time. A limitation to this report may be that it needs raw data windows at points in time that a user desires to compare.

Existing data warehouse systems are not typically designed to accommodate for alterations in the data warehouse configuration after the data warehouse is released to operation. As discussed above, the configuration of a data warehouse requires the analysis of query type and the design of a set of cubes to accommodate the ETL processing of received data. This configuration may involve the creation of a new set of databases or data stores, and the programming of several functions for manipulating the data and loading it into the data stores. Thus, ad hoc queries have not been easily satisfied with existing data warehouse systems. The claimed method and system enables ad hoc querying to be performed more efficiently and economically. Information required to satisfy ad hoc querying may be obtained quickly based on the strategic loading of raw data based on storage access speed. The claimed method and system reduces the need for additional experts to perform the ad hoc query. Moreover, because strategic sampling is used, storage space is conserved.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments may be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

The invention claimed is:

1. A method of data warehousing incoming data from a reporting application, the method comprising:
 receiving raw data from the reporting application;
 selecting a time marker, wherein the time marker relates to a product cycle milestone;
 sampling the received raw data at a first sampling rate when a rate of incoming raw data exceeds a threshold level associated with the time marker;
 storing a first sampled data portion in a first memory medium, the first sampled data portion sampled at the first sampling rate;
 changing to a second sampling rate when the rate of incoming raw data falls below the threshold level associated with the time marker, the second sampling rate lower than the first sampling rate;
 sampling the received raw data at the second sampling rate; and
 storing a second sampled data portion in a second memory medium, the second sampled data portion sampled at the second sampling rate, wherein the first memory medium operates at a higher access speed than the second memory medium.

2. The method of claim 1, wherein selecting the time marker comprises selecting the time marker based on a usage characteristic of the reporting application.

3. The method of claim 2, wherein the first sampled data portion is stored in a high speed access medium when the usage characteristic is high and a low speed access medium when the usage characteristic is low.

4. The method of claim 2, wherein the usage characteristic is an incoming data traffic pattern.

5. The method of claim 1, further comprising monitoring the received raw data for a usage pattern and selecting the time marker based on the usage pattern.

6. The method of claim 1, further comprising monitoring the received raw data for a set of data characteristics relating to a metric and selecting a content of the first and second sampled portions based on the set of data characteristics.

7. The method of claim 6, wherein selecting the content of the first and second sampled portions comprises selecting a control set of reporting application data and randomly selecting a variable set of reporting application data.

8. The method of claim 7, further comprising monitoring the control set and the variable set and selecting the time marker based on a statistically significant deviation between the control set and the variable set.

9. The method of claim 1, further comprising:

receiving a query;

checking a directory table to determine whether an information corresponding to the query is in one of an aggregate data store and a set of raw data stores;

determining a one of the set of raw data stores from which to retrieve the information to answer the query;

estimating a duration to retrieve the information based on a characteristic of the one of the set of raw data stores, wherein the characteristic is an access speed of the one of the set of raw data stores; and retrieving the information from the one of the set of raw data stores.

10. The method of claim 9, further comprising creating a cube if query data is stored in the one of the set of raw data stores and loading the cube with data from the one of the set of raw data stores, and wherein the query is answered through a data warehouse using the cube.

11. A computer-readable storage medium having computer-executable instructions for performing operations comprising:

receiving raw data from a reporting application;

selecting a time marker, wherein the time marker relates to a product cycle milestone;

monitoring a rate of data received to determine when an amount of traffic increases past a threshold level associated with the time marker;

sampling the received raw data at a higher sampling rate when the raw data is received at a rate above the threshold level and sampling at a lower sampling rate when the raw data is received at a rate below the threshold level; and storing a first sampled data portion in a high speed access data store when the first sampled data portion is sampled at the higher sampling rate and storing a second sampled data portion that is sampled at the lower sampling rate in a data store having lower speed access than the high speed access data store.

12. The computer-readable storage medium of claim 11, further comprising:

receiving a query;

creating a cube for a data warehouse;

loading the cube with information from one of the high speed access data store and the data store having lower speed access; and responding to the query using the cube.

* * * * *

UNITED STATES PATENT AND TRADEMARK OFFICE
CERTIFICATE OF CORRECTION

PATENT NO. : 7,587,388 B2  Page 1 of 1
APPLICATION NO. : 11/191322
DATED : September 8, 2009
INVENTOR(S) : Auerbach et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 565 days.

Signed and Sealed this

Twenty-first Day of September, 2010

David J. Kappos
*Director of the United States Patent and Trademark Office*